United States Patent
Goldstein et al.

(10) Patent No.: US 11,248,830 B2
(45) Date of Patent: Feb. 15, 2022

(54) STORAGE UNIT FOR MAINTAINING A GENERALLY CONSTANT TEMPERATURE

(71) Applicant: SUNWELL ENGINEERING COMPANY LIMITED, Woodbridge (CA)

(72) Inventors: Vladimir Goldstein, Woodbridge (CA); Jessica Currey, Woodbridge (CA); Alexander Chong, Woodbridge (CA)

( * ) Notice: Subject to any disclaimer, the term of this patent is extended or adjusted under 35 U.S.C. 154(b) by 306 days.

(21) Appl. No.: 15/301,532

(22) PCT Filed: Apr. 2, 2015

(86) PCT No.: PCT/CA2015/000226
§ 371 (c)(1),
(2) Date: Oct. 3, 2016

(87) PCT Pub. No.: WO2015/149159
PCT Pub. Date: Oct. 8, 2015

(65) Prior Publication Data
US 2017/0038115 A1    Feb. 9, 2017

Related U.S. Application Data

(60) Provisional application No. 61/975,289, filed on Apr. 4, 2014.

(51) Int. Cl.
| | | |
|---|---|---|
| F25D 3/06 | (2006.01) | |
| F25D 3/00 | (2006.01) | |
| F25D 11/02 | (2006.01) | |
| F25D 17/02 | (2006.01) | |

(52) U.S. Cl.
CPC .............. *F25D 3/06* (2013.01); *F25D 3/005* (2013.01); *F25D 11/02* (2013.01); *F25D 17/02* (2013.01)

(58) Field of Classification Search
CPC . F25D 3/06; F25D 3/005; F25D 11/02; F25D 17/02; F25D 13/04; F25D 2201/14
USPC .................................... 62/371, 457.1, 259.1
See application file for complete search history.

(56) References Cited

U.S. PATENT DOCUMENTS

| | | | |
|---|---|---|---|
| 4,137,898 A * | 2/1979 | Koizumi ............... | F24D 11/007 126/400 |
| 4,286,574 A | 9/1981 | Vrolyk et al. | |
| 5,005,364 A * | 4/1991 | Nelson ..................... | F25C 5/00 62/76 |

(Continued)

FOREIGN PATENT DOCUMENTS

| | | |
|---|---|---|
| DE | 19735584 | 2/1999 |
| EP | 0 890 525 | 1/1999 |

(Continued)

OTHER PUBLICATIONS

European Search Report dated Oct. 26, 2017 in PCT/CA2015000226, 9 pages.

(Continued)

*Primary Examiner* — David J Teitelbaum
(74) *Attorney, Agent, or Firm* — Faegre Drinker Biddle & Reath LLP

(57) ABSTRACT

A storage unit comprises a casing defining an interior space for holding at least one item, a thermal element lining an interior surface of at least one side of the casing, and at least one thermal battery thermally coupled to the thermal element.

17 Claims, 17 Drawing Sheets

(56) References Cited

U.S. PATENT DOCUMENTS

| | | | | |
|---|---|---|---|---|
| 5,548,967 | A * | 8/1996 | Ghiraldi | F25D 3/06 62/434 |
| 5,918,478 | A * | 7/1999 | Bostic | B65D 81/2038 220/592.25 |
| 6,059,016 | A | 5/2000 | Rafalovich et al. | |
| 6,367,268 | B1 * | 4/2002 | Paul | B60H 1/3235 62/330 |
| 6,895,778 | B1 | 5/2005 | Ackerman | |
| 7,681,410 | B1 * | 3/2010 | Bean, Jr. | F25D 16/00 361/699 |
| 7,975,504 | B2 * | 7/2011 | Whewell, Jr. | F25D 3/122 62/388 |
| 8,186,178 | B2 | 5/2012 | Böss | |
| 8,726,653 | B2 * | 5/2014 | Tice | F25D 3/00 60/527 |
| 9,389,007 | B1 * | 7/2016 | McKay | F25B 27/00 |
| 2002/0070372 | A1 * | 6/2002 | Okada | C09K 5/066 252/78.3 |
| 2007/0051734 | A1 * | 3/2007 | Kuhn | F25D 3/06 220/592.27 |
| 2008/0014482 | A1 * | 1/2008 | Yamamiya | H01M 8/04007 429/421 |
| 2008/0129053 | A1 * | 6/2008 | Piercey | F01P 1/06 290/1 B |
| 2009/0234705 | A1 * | 9/2009 | Brunschwiler | G06F 1/206 62/259.2 |
| 2013/0228313 | A1 * | 9/2013 | Fried | F28D 15/0266 165/104.26 |
| 2014/0130519 | A1 * | 5/2014 | De Pelsemaeker | B60H 1/00478 62/3.61 |
| 2014/0150464 | A1 * | 6/2014 | Bloedow | F25D 11/006 62/3.62 |
| 2015/0107292 | A1 * | 4/2015 | Cousaert | F25D 3/06 62/457.2 |
| 2015/0118435 | A1 * | 4/2015 | Kimura | B32B 37/18 428/69 |
| 2015/0128614 | A1 * | 5/2015 | Ghoshal | F25B 21/00 62/3.3 |

FOREIGN PATENT DOCUMENTS

| | | |
|---|---|---|
| JP | 2001-122342 | 5/2001 |
| JP | 2002-162068 | 6/2002 |

OTHER PUBLICATIONS

International Search Report dated Jun. 18, 2015 in PCT/CA2015/000226.

Written Opinion dated Jun. 18, 2015 in PCT/CA2015/000226.

* cited by examiner

STORAGE UNIT FOR MAINTAINING A GENERALLY CONSTANT TEMPERATURE

CROSS-REFERENCE TO RELATED APPLICATIONS

This application is the U.S. national stage of PCT/CA2015/000226, filed on Apr. 2, 2015, which claims the benefit of U.S. Provisional Application No. 61/975,289 to Goldstein et al., filed on Apr. 4, 2014, the contents of which are incorporated herein by reference in their entirety.

FIELD

The subject application relates generally to storage units and in particular, to a storage unit for maintaining a generally constant temperature.

BACKGROUND

Shipping and storing temperature-sensitive products requires a storage unit that maintains a constant internal temperature so that the products do not spoil due to low or high temperatures. Although the temperature inside such a storage unit can be actively maintained, for example, with a refrigeration unit, passive temperature regulation is preferred, due to decreased cost and the elimination of the need for a continuous power source during shipment.

U.S. Pat. No. 6,367,268 to Paul discloses a method for the refrigerated transportation of a product introduced into a hollow-walled refrigerated container. The steps of the method include: a) keeping a pumpable suspension of minute ice crystals (binary-ice), having a predetermined composition and temperature in a reservoir; b) emptying an optionally filled wall of a refrigerated container through an outlet valve, thereby filling the emptied wall of the refrigerated container with binary-ice; c) allowing the binary ice to circulate in the refrigerated container by means of filling valves, which are supplied by the binary ice reservoir until the wall temperature has dropped to a predetermined level and heated fluid passing out of the outlet valve is supplied to the reservoir; d) filling the wall of the refrigerated container with binary ice up to a predetermined level and decoupling the refrigerated container from the filling valves; and e) returning the binary ice fluid into a corresponding binary ice liquid reservoir for further production of binary ice from the binary ice fluid.

U.S. Pat. No. 8,186,178 to Boss discloses a container for the cooling and/or cold storage of foods and/or beverages which comprises at least one storage tank for a multi-phase flowable cooling medium wherein the cooling effect is still as uniform as possible over the entire height of the storage tank even when the multi-phase flowable cooling medium has been stored in the storage tank for a long period of time. The storage tank is divided into a plurality of storage tank segments which are separated from each other by partition walls which extend horizontally or are inclined to the vertical.

Although various storage units for storing temperature-sensitive products have been considered, improvements are desired. It is therefore an object to provide a novel thermal battery casing and storage unit incorporating the same.

SUMMARY

Accordingly, in one aspect there is provided a storage unit comprising a casing defining an interior space for holding at least one item, a thermal element lining an interior surface of at least one side of the casing, and at least one thermal battery thermally coupled to the thermal element.

In embodiments, the thermal element lines an interior surface of a plurality of sides of the casing. The storage unit comprises an insulation layer lining the thermal element.

In embodiments, the at least one thermal battery comprises a housing and an inlet configured to permit the ingress of thermal storage medium into the housing. The at least one thermal battery comprises interior wall structure positioned within the housing for directing thermal storage medium receive via the inlet along a path. The at least one thermal battery comprises an outlet configured to permit the egress of liquid and/or thermal storage medium from the housing.

In embodiments, the at least one thermal battery at least partially extends about the interior space. The at least one thermal battery comprises a housing and an inlet configured to permit the ingress of thermal storage medium into the housing. The at least one thermal battery comprises an outlet configured to permit the egress of liquid and/or thermal storage medium from the housing. The housing is generally C-shaped.

According to another aspect there is provided a thermal battery comprising a housing, an inlet configured to permit the ingress of thermal storage medium into the housing, and interior wall structure positioned within the housing for directing thermal storage medium received via the inlet along a path.

According to another aspect there is provided a thermal battery comprising a housing, an inlet configured to permit the ingress of thermal storage medium into the housing, and an outlet configured to permit the egress of liquid and/or thermal storage medium from the housing.

According to yet another aspect there is provided a storage unit comprising a casing defining an interior space for holding at least one item, at least one thermal battery positioned within the interior space, and an insulation layer lining an interior surface of the casing.

BRIEF DESCRIPTION OF THE DRAWINGS

Embodiments will now be described more fully with reference to the accompanying drawings in which.

DETAILED DESCRIPTION OF THE EMBODIMENTS

Figure 1:
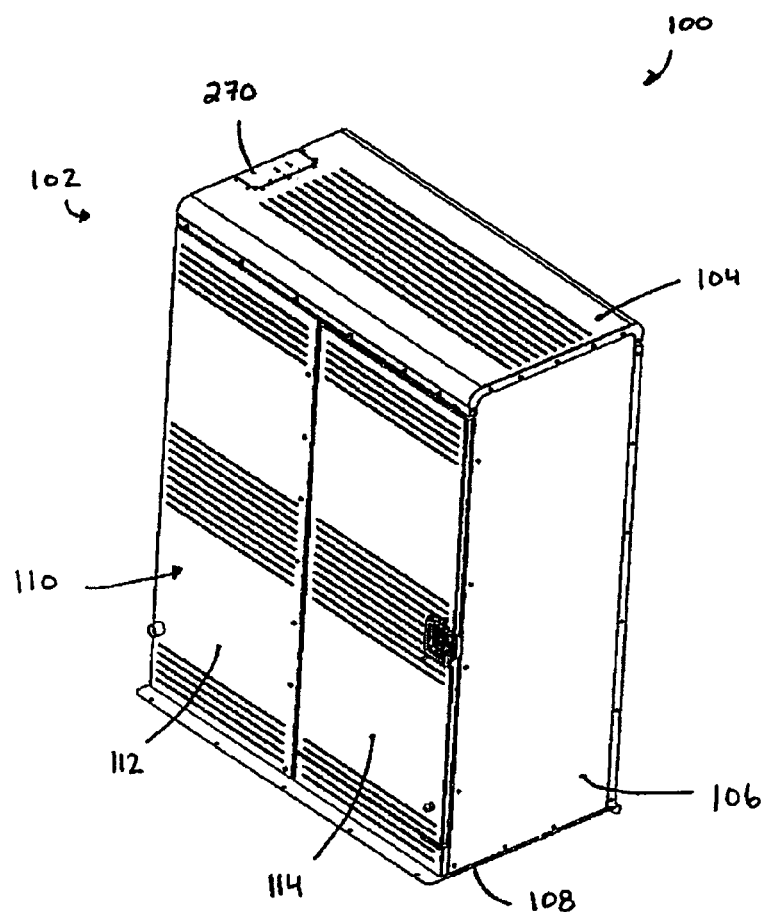
FIG. 1 is an isometric view of a storage unit.

Turning to FIGS. 1 to 4, a storage unit configured to hold one or more temperature-sensitive items or goods, such as for example food products, medical products etc., is shown and is generally identified by reference numeral 100. The storage unit comprises a casing 102 which in this embodiment is made of a generally lightweight rigid material such as for example a fiber material, plastic etc. The casing 102 comprises top and bottom walls 104 and 108, respectively, side walls 106 extending between the top and bottom walls 104 and 108, a rear wall (not shown) extending between the side walls 106, and a front wall 110 extending between the side walls 106. The front wall 110 comprises a front panel 112 and a door 114. The door 114 provides access to the interior of the storage unit 100.

Figure 2:
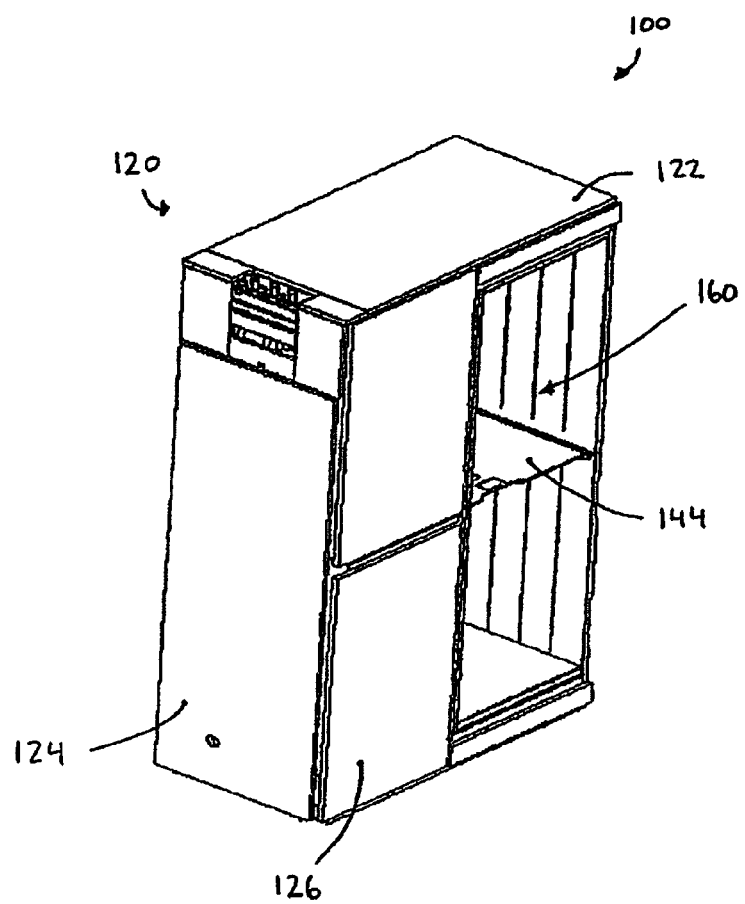
FIG. 2 is an isometric view showing an insulation layer forming part of the storage unit of FIG. 1.

An insulation layer 120 lines the interior surface of the casing 102, as shown in FIG. 2. In this embodiment, the insulation layer 120 comprises a plurality of vacuum insulated panels (VIP). Specifically, the insulation layer 120 comprises a top VIP 122 lining the interior surface of the top wall 104, side VIPs 124 lining the interior surfaces of the side walls 106, a bottom VIP (not shown) lining the interior surface of the bottom wall 108, a rear VIP (not shown) lining the interior surface of the rear wall, and front VIPs 126 lining the interior surfaces of the front panel 112 and the door 114.

Figure 3:
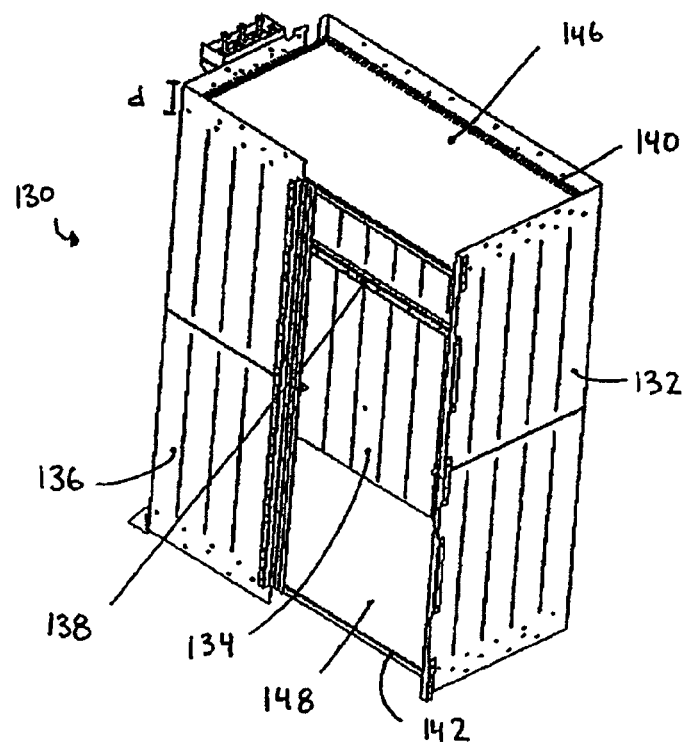
FIG. 3 is an isometric view showing a thermal shield forming part of the storage unit of FIG. 1.
Figure 4:
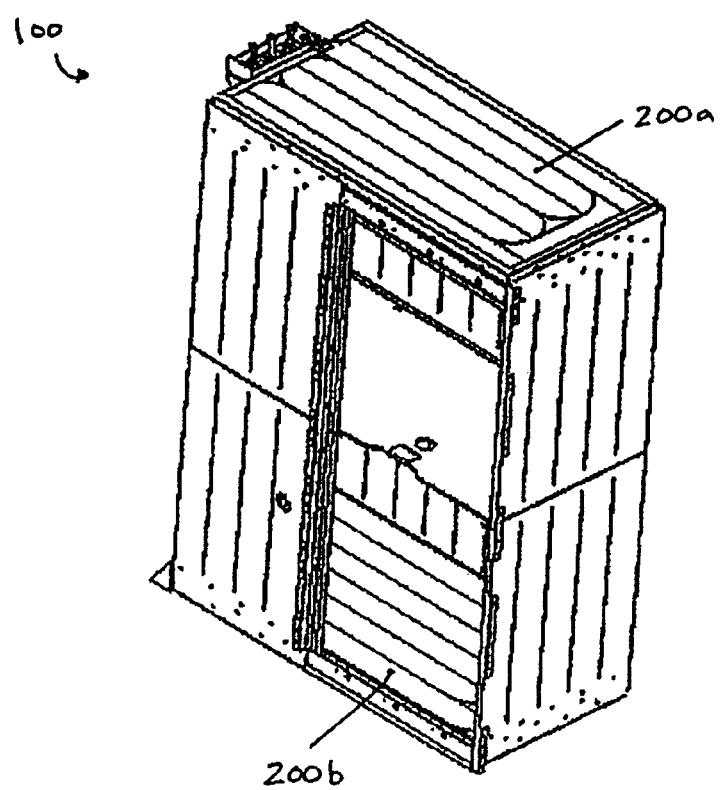
FIG. 4 is an isometric view showing thermal batteries forming part of the storage unit of FIG. 1.

A thermal element in the form of a thermal shield 130 lines the interior surfaces of the VIPs, as shown in FIG. 3. In particular, the thermal shield 130 comprises side panels 132 lining the interior surface of the side VIPs 124, rear panels 134 lining the interior surface of the rear VIP and front panels 136 lining the interior surfaces of the front VIPs 126. The side panels 132, rear panels 134 and front panels 136 of the thermal shield 130 are made of a thermally conductive material such as aluminum.

The side panels 132, rear panels 134, and front panels 136 enclose an interior space 160. A middle flange 138 extends about the periphery of the interior space 160 at a point generally midpoint each of the side panels 132, rear panels 134 and front panels 136 and is configured to support a shelf. A top flange 140 extends about the periphery of the interior space 160 at a distance d from the top of each of the side panels 132, rear panels 134 and front panels 136. A bottom flange 142 extends about the periphery of the interior space 160 adjacent to the bottom of each of the side panels 132, rear panels 134 and front panels 136.

A shelf 144 is positioned on the middle flange 138 and is configured to support one or more temperature-sensitive items. A top panel 146 is positioned on the top flange 140 and a bottom panel 148 is positioned on the bottom flange 142. The shelf 144, top panel 146 and bottom panel 148 are made of a rigid material such as aluminum. As will be appreciated, the top panel 146 and bottom panel 148 may include a layer of insulation.

Thermal batteries 200a and 200b are thermally coupled to the thermal shield 130. As can be seen, thermal battery 200a is positioned above the top panel 146 and is connected to and thermally coupled to the thermal shield 130. Thermal battery 200b is positioned below the bottom panel 148 and is connected to and thermally coupled to the thermal shield 130. As a result, each of the thermal batteries 200a and 200b exchange thermal energy with the thermal shield 130.

Figure 5:
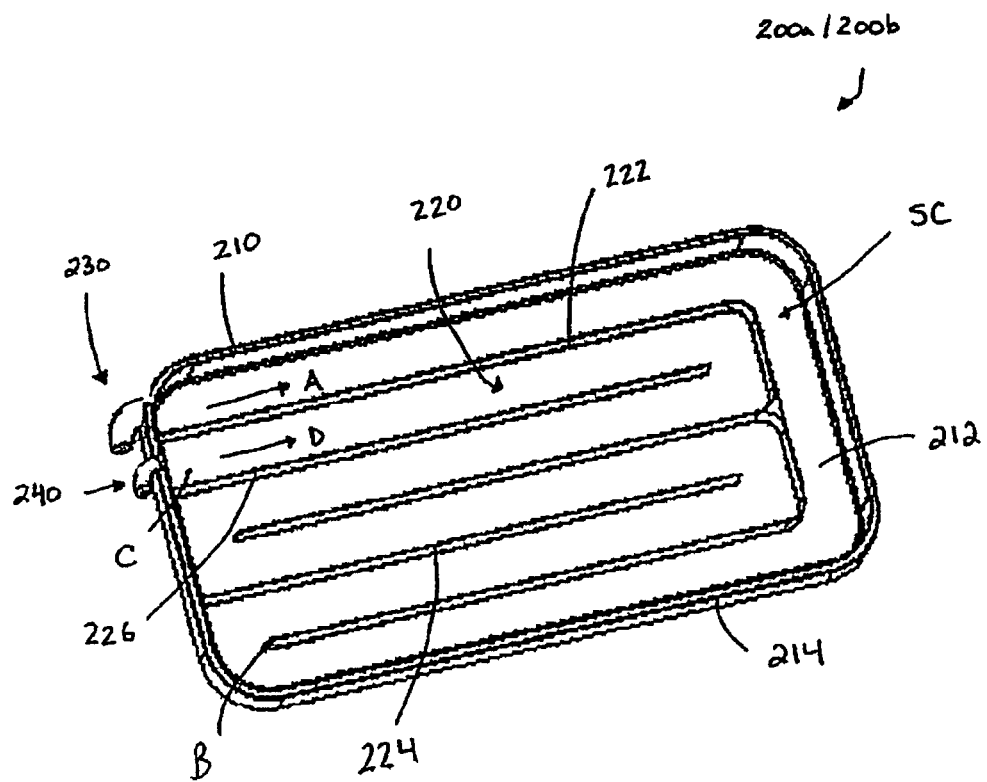
FIG. 5 is a cross-sectional view of one of the thermal batteries of FIG. 4.

A cross-sectional view of one of the thermal batteries 200a and 200b is shown in FIG. 5. Each thermal battery 200a, 200b comprises a generally rectangular housing 210 having rounded corners. In this embodiment, the housing 210 comprises a bottom wall 212, a side wall 214, and a top wall (not shown). The side wall 214 extends about the periphery of the housing 210. The housing 210 is made of a thermally conductive material such as for example aluminum, a composite material, a plastic material, etc. In this embodiment, the interior surface of the bottom wall 212 is coated with a low friction material such as for example Teflon®, a lubricating material, a wetting material, etc.

Interior wall structure 220 is positioned within the housing 210. In this embodiment, the interior wall structure 220 comprises an M-shaped member 222 and dividing members 224 and 226. The M-shaped member 222 and dividing members 224 and 226 are made of a thermally conductive material such as for example aluminum, a composite material, a plastic material, etc. The M-shaped member 222 and dividing members 224 and 226 are coated with a low friction material. The side walls 214 of the housing 210 and the interior wall structure 220 define a serpentine channel SC for directing thermal storage medium along a serpentine path.

A thermal storage medium inlet/outlet 230 and an air inlet/outlet 240 are provided on the housing 210. The thermal storage medium inlet/outlet 230 is configured to permit controlled ingress and egress of a thermal storage medium into and out of the housing 210. The air inlet/outlet 240 is configured to permit the ingress or egress of air into and out of the housing 210.

Figure 6A:
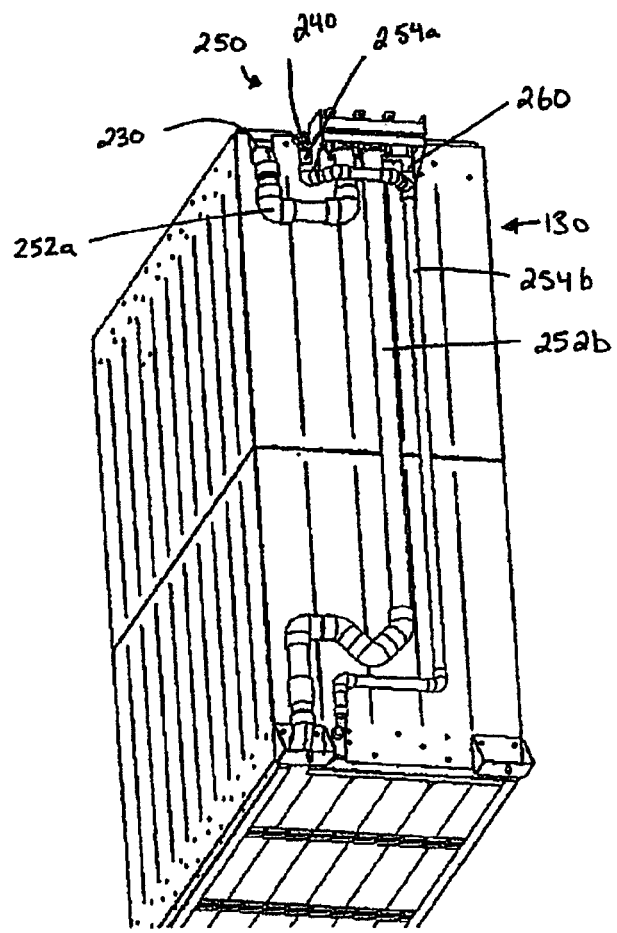
FIGS. 6a and 6b are isometric views showing a piping assembly forming part of the storage unit of FIG. 1.
Figure 6B:
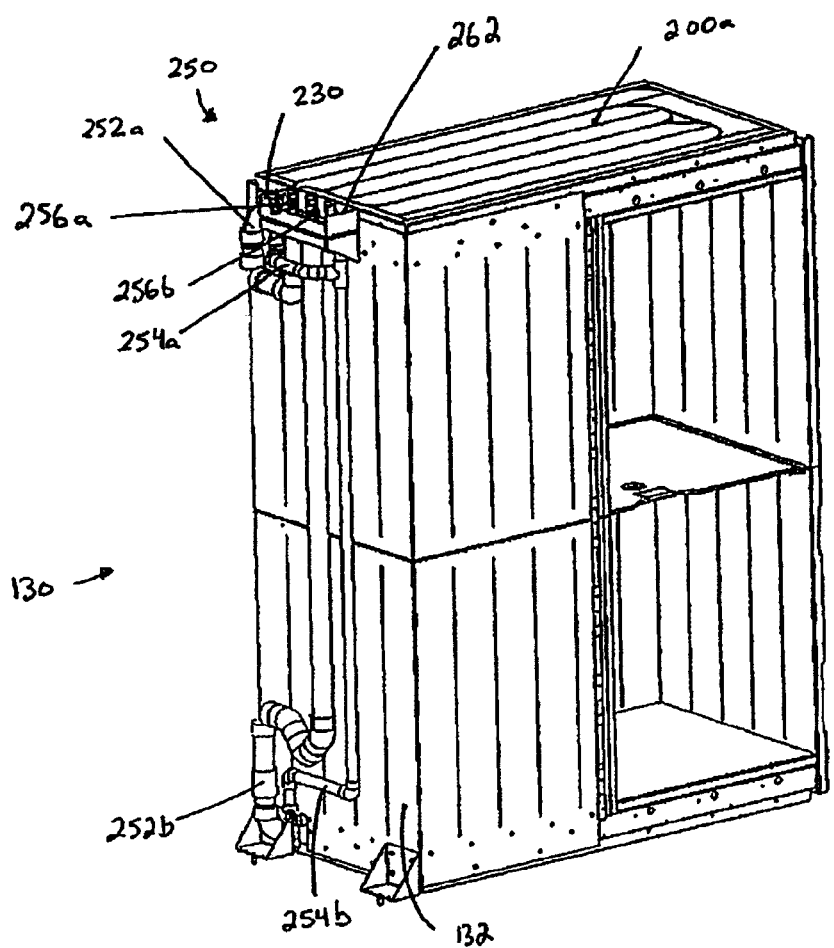

Piping assembly 250 is coupled to the thermal batteries 200a and 200b and is shown in FIGS. 6a and 6b. The piping assembly 250 is connected to one of the side panels 132 of the thermal shield 130. Piping assembly 250 comprises a pipe 252a connected at a first end to a hose connection assembly 256a and at a second end to the thermal storage medium inlet/outlet 230 of thermal battery 200a. Another pipe 252b is connected at a first end to a hose connection assembly 256b and at a second end to the thermal storage medium inlet/outlet 230 of thermal battery 200b. An air pipe 254a is connected at a first end to a pipe fitting 258 and at a second end to the air inlet/outlet 240 of the thermal battery 200a. Another air pipe 254b is connected at a first end to the pipe fitting 258 and at a second end to the air inlet/outlet 240 of the thermal battery 200b. An air pipe 260 is configured to connect the pipe fitting 258 to an air hose connection assembly 262. A removable cover 270 (shown in FIG. 1) covers the hose connection assemblies 256a and 256b and the air hose connection assembly 262.

The thermal batteries 200a and 200b may be partially charged or fully charged with a thermal storage medium. The degree of charging of the thermal batteries 200a and 200b allows the degree of thermal energy exchange from the thermal batteries 200a and 200b to the interior space 160 and the thermal shield 130 to be controlled as desired. As a result, a generally uniform temperature of a desired value may be maintained within interior space 160.

Figure 7A:
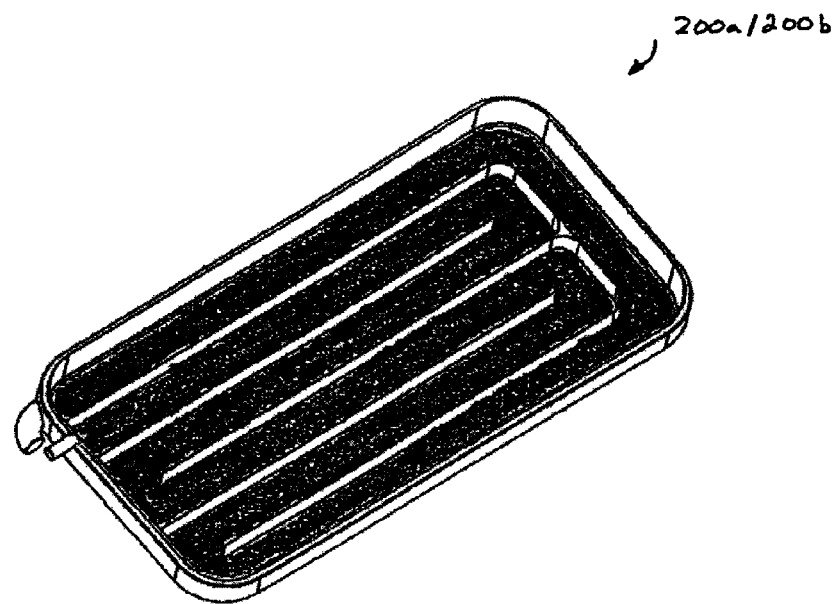
FIGS. 7a and 7b are cross-sectional views of the thermal battery of FIG. 5 in a charged and partially charged state, respectively.
Figure 7B:
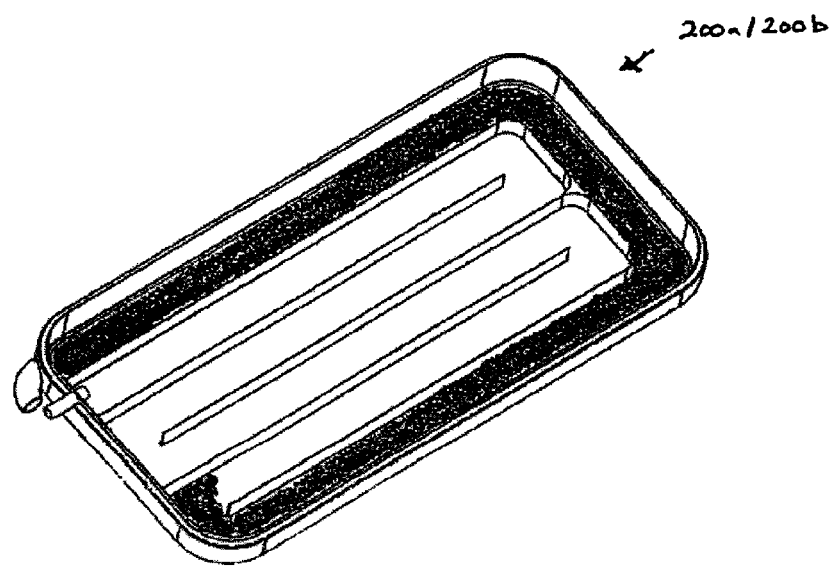

During use, to charge the thermal batteries 200a and 200b, thermal storage medium is pumped into the pipes 252a and 252b by a pumping unit (not shown) via the hose connection assemblies 256a and 256b. The thermal storage medium flows through the pipes 252a and 252b and into the housing 210 of each thermal battery 200a and 200b via the thermal storage medium inlet/outlet 230. Inside each housing 210, the thermal storage medium flows along the serpentine channel SC, indicated by arrow A in FIG. 5. As mentioned previously, the controlled ingress of thermal storage medium permits each thermal battery 200a and 200b to be partially charged or fully charged as desired. For example, the ingress of thermal storage medium into the housing 210 of each thermal battery 200a and 200b may be controlled such that the thermal storage medium stops along the serpentine channel SC at a desired position intermediate its length, such as for example location B shown in FIG. 5. To fully charge the thermal batteries 200a and 200b, the ingress of thermal storage medium is only stopped once the thermal storage medium has reached location C shown in FIG. 5. A fully charged thermal battery 200a, 200b is shown in FIG. 7a and a partially charged thermal battery 200a, 200b is shown in FIG. 7b.

To discharge the thermal batteries 200a and 200b, air is pumped into air pipe 260 via the air hose connection assembly 262. The air travels through the air pipe 260 and the pipe fitting 258, into air pipes 254a and 254b, and into the housing 210 of each of the thermal batteries 200a and 200b via the air inlet/outlets 240. Inside each housing 210, air flows along the serpentine channel SC, indicated by arrow D in FIG. 5. The ingress of air forces the thermal storage medium to exit the housing 210 via the thermal storage medium inlet/outlet 230. Air can be pumped into the housing 210 until the desired amount of thermal storage medium has been removed from the housing 210. As will be appreciated, the removed thermal storage medium may be captured and recycled for further use. Once each thermal battery 200a and 200b has been discharged, the thermal batteries 200a and 200b may be recharged as described above.

The storage unit 100 may be used as a heating storage unit or a cooling storage unit to maintain a generally uniform temperature within interior space 160 during shipping or storage operations such that any item placed within the interior space 160 does not spoil depending on the type of thermal storage medium used to charge the thermal batteries 200a and 200b.

When used as a heating storage unit, thermal storage medium in the form of a heating liquid, such as for example glycol, is pumped into the thermal batteries 200a and 200b as described above.

When used as a cooling storage unit, thermal storage medium in the form of ice slurry having an ice fraction of approximately 40% or higher is pumped into the thermal batteries 200a and 200b as described above. The use of ice slurry having an ice fraction of 40% or higher permits the thermal batteries to be charged for an extended period of time. As will be appreciated, varying the concentration of additives used in the ice slurry varies the temperature of each thermal battery 200a and 200b, and thus varies the temperature of the interior space 160.

Figure 8:
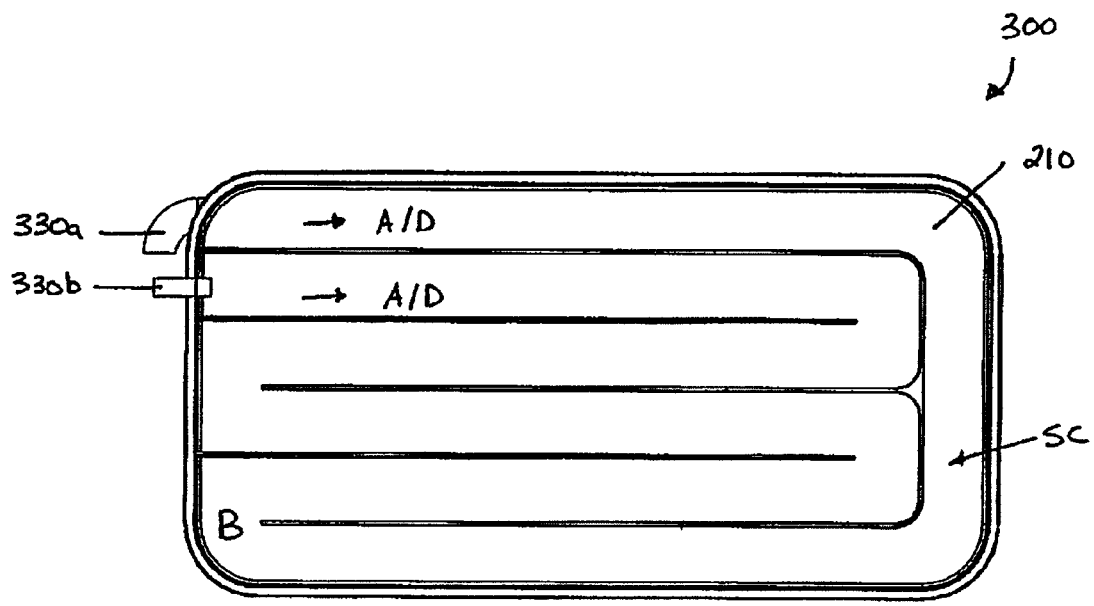
FIG. 8 is a cross-sectional view of another embodiment of a thermal battery.

Turning now to FIG. 8, a cross-sectional view of another embodiment of a thermal battery 300 for use in the storage unit 100 is shown. As can be seen, thermal battery 300 is similar to thermal batteries 200a and 200b described above with the exception that thermal battery 300 comprises two thermal storage medium inlet/outlets 330a and 330b positioned at opposite ends of the serpentine channel SC. In this embodiment, thermal storage medium is pumped into the housing 210 through one of the thermal storage medium inlet/outlets 330a and 330b, thereby allowing the thermal battery 300 to be charged in either direction. In another embodiment, one of the thermal storage medium inlet/outlets 330a and 330b may be used to pump thermal storage medium into the housing 210 while the other of the thermal storage medium inlet/outlets 330a and 330b may be connected to a vacuum unit and used to provide suction to the housing 210 to draw the thermal storage medium through the serpentine channel SC.

Figure 9:
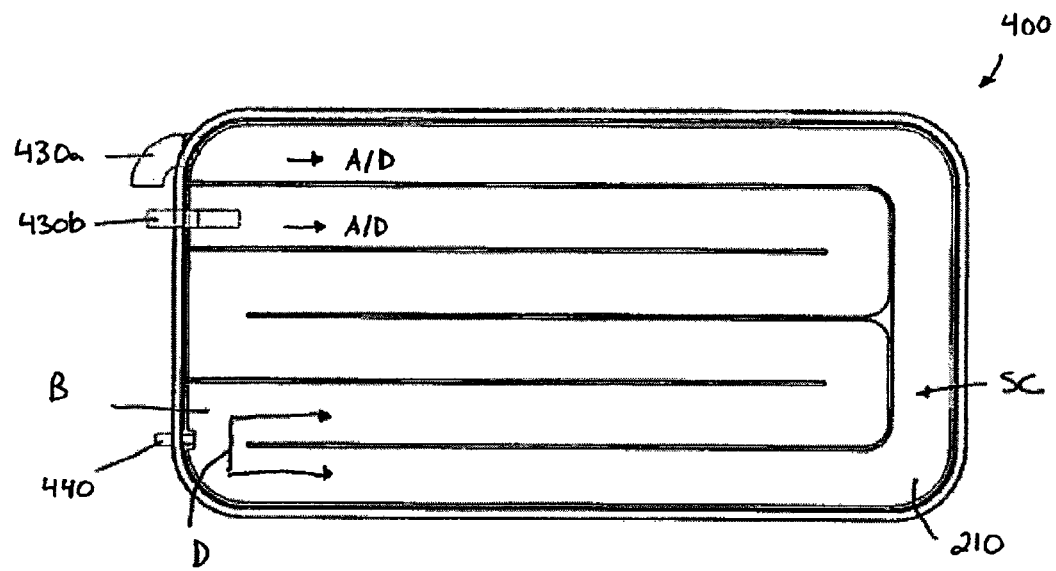
FIG. 9 is a cross-sectional view of another embodiment of a thermal battery.

Turning to FIG. 9, a cross-sectional view of another embodiment of a thermal battery 400 for use in the storage unit 100 is shown. As can be seen, thermal battery 400 is similar to thermal batteries 200a and 200b described above with the exception that thermal battery 400 comprises two thermal storage medium inlet/outlets 430a and 430b positioned at opposite ends of the serpentine channel SC and an air inlet/outlet 440 positioned approximately at the midpoint of the serpentine channel SC. In this embodiment, thermal storage medium may be pumped into the housing 210 through both of the thermal storage medium inlet/outlets 430a and 430b, thereby reducing the amount of time required for the thermal battery 400 to be charged.

Figure 10:
FIG. 10 is a side view of another embodiment of a thermal battery.

Turning now to FIG. 10, a side view of another embodiment of a thermal battery 500 for use in the storage unit 100 is shown. As can be seen, thermal battery 500 is similar to thermal batteries 200a and 200b described above with the exception that an outlet 550 is provided on a bottom surface of the housing 210 adjacent to one of the side walls 214. The outlet 550 is coupled to a first end of a vacuum unit hose 552. A second end of the vacuum unit hose 552 is connected to a vacuum unit (not shown). The vacuum unit provides suction to the housing 210 to drain out unwanted thermal storage medium.

Figure 11:
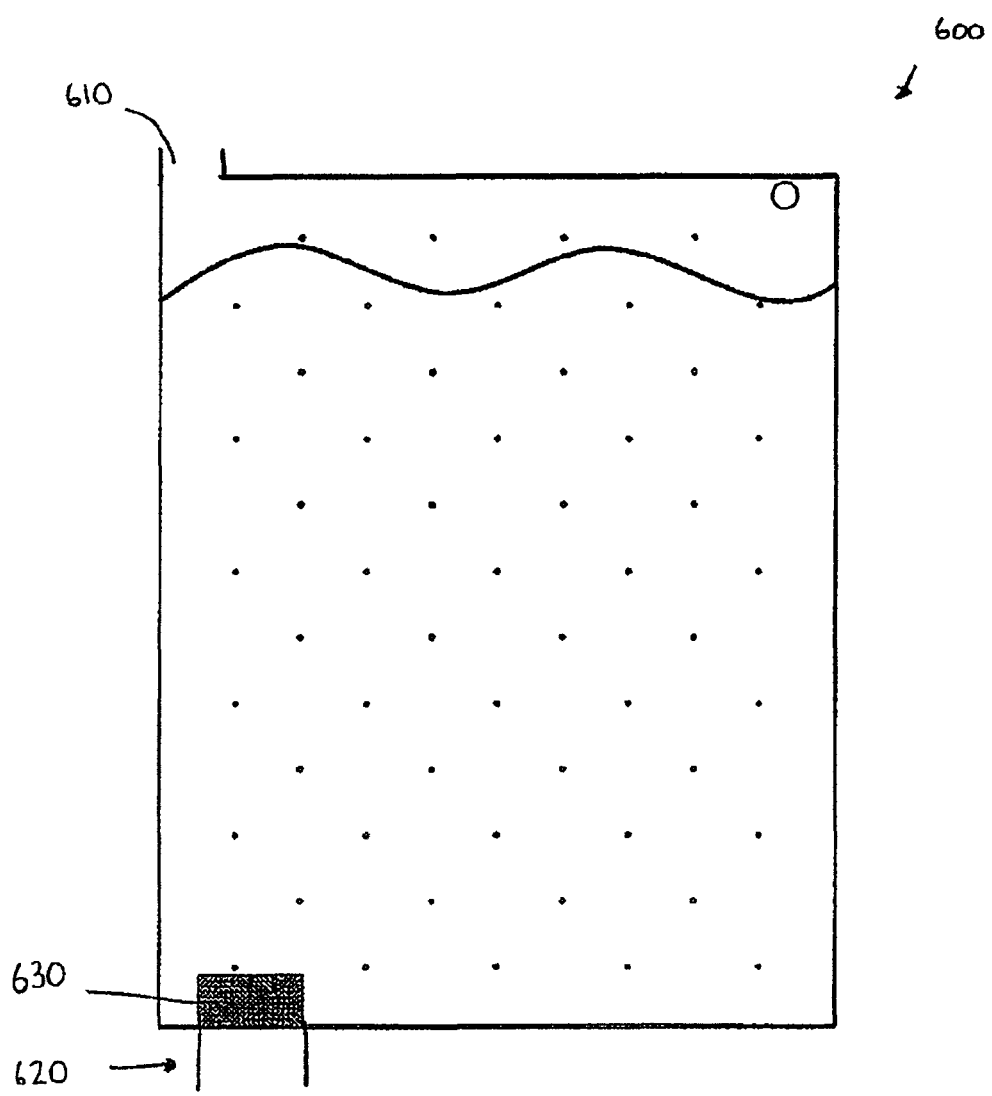
FIG. 11 is a cross-sectional view of another embodiment of a thermal battery.

Turning now to FIG. 11, a cross-sectional view of another embodiment of a thermal battery 600 for use in the storage unit 100 is shown. As can be seen, thermal battery 600 is similar to thermal batteries 200a and 200b with the exception that thermal battery 600 does not comprise an interior wall structure. A thermal storage medium inlet 610 is positioned on the housing 210 adjacent a corner of the housing 210 and an outlet 620 is positioned on the housing 210 adjacent an opposite corner of the housing 210. A filter 630 is positioned within the outlet 620 and is dimensioned to permit liquid to drain out of the housing 210 but inhibit thermal storage medium from draining out of the housing 210. In this embodiment, thermal storage medium in the form of ice slurry having an ice fraction below approximately 40% is pumped into the housing 210 through thermal storage medium inlet 610 using a pumping unit. During this operation, the ice slurry travels into the housing 210 towards the outlet 620. Excess liquid in the ice slurry is drawn out of the housing 210 via outlet 620 by a vacuum unit (not shown), thereby increasing the ice fraction of the ice slurry contained within housing 210. Ice slurry is continuously pumped into the housing 210 until ice slurry having a desired ice fraction (greater than 40%) is contained within the housing 210. As will be appreciated, in this embodiment, excess liquid may be continuously drawn out of the housing 210 through the inlet/outlet 620.

Although it is described that excess liquid in the ice slurry is removed from the housing through the outlet using a vacuum unit, those skilled in the art will appreciate that alternatives are available. For example, in another embodiment excess liquid in the ice slurry may be removed from the housing through the outlet under the influence of gravity.

Figure 12:
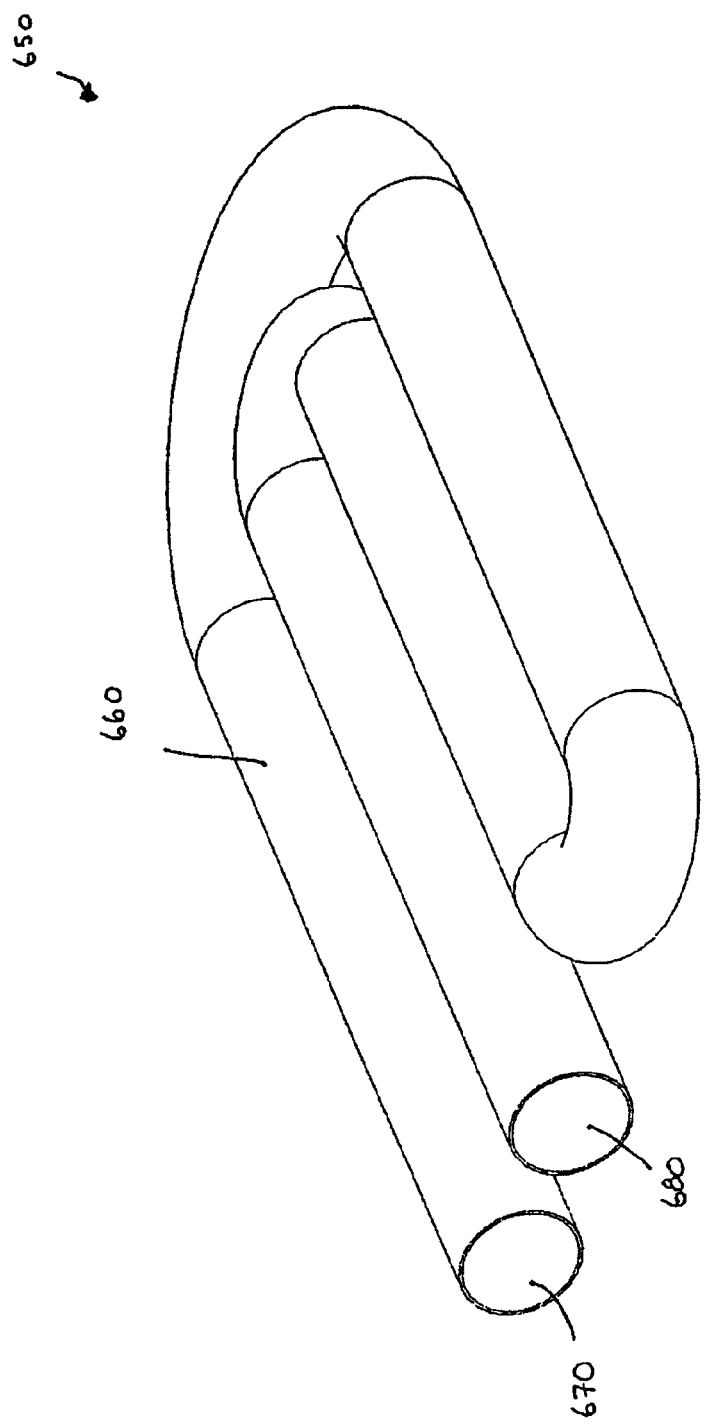
FIG. 12 is an isometric view of another embodiment of a thermal battery.

Turning now to FIG. 12, an isometric view of another embodiment of a thermal battery 650 for use in the storage unit 100 is shown. In this embodiment, the thermal battery 650 comprises a body 660 made of a single piece of thermally conductive pipe. The body 660 comprises an inlet/outlet 670 and an inlet/outlet 680. A serpentine channel SC is defined by the body 660 between the inlet/outlet 670 and the inlet/outlet 680. End caps (not shown) are used to cover the inlet/outlet 670 and inlet/outlet 680 when the thermal battery 650 is not being charged or discharged.

During use, to charge the thermal battery 650, thermal storage medium is pumped into the body 660 by a pumping unit via the inlet/outlet 670. Inside the body 660, the thermal storage medium flows through the serpentine channel SC. The controlled ingress of thermal storage medium permits the thermal battery 650 to be partially charged or fully charged, similar to that described above.

To discharge the thermal battery 650, air is pumped by a pumping unit via the inlet/outlet 670. The air travels through the serpentine channel SC. The ingress of air forces the thermal storage medium to exit the body 660 via the inlet/outlet 680. Air is pumped into the body 660 until the desired amount of thermal storage medium has been removed. As will be appreciated, the removed thermal storage medium may be captured and recycled for further use.

As will be appreciated, the thermal battery 650 may be mounted within a thermally conductive housing, wherein the thermally conductive housing is thermally coupled to the thermal shield.

Although thermal battery 650 is described as being charged using the inlet 670, those skilled in the art will appreciate that the inlet/outlet 680 may also be used to charge the thermal battery 650. In this embodiment, an air hole is provided on the body 660 and thermal storage medium is pumped into the body 660 using both inlet/outlets 670 and 680.

Figure 13:
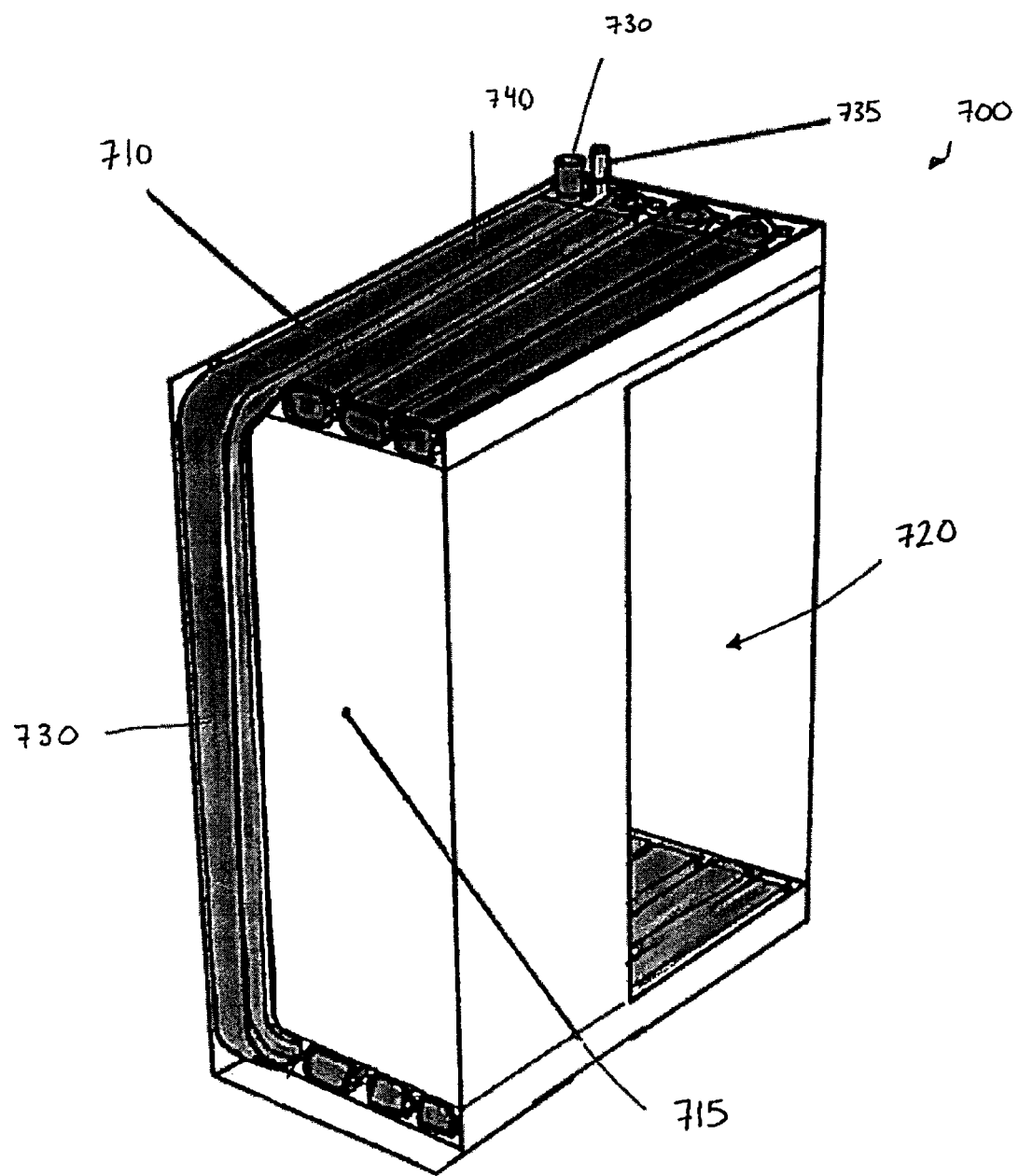
FIG. 13 is an isometric view of another embodiment of a storage unit.

Turning now to FIG. 13, another embodiment of a storage unit is shown and is generally identified by reference numeral 700. Similar to storage unit 100, storage unit 700 comprises a casing (not shown) having an interior surface lined with an insulation layer (not shown). One or more thermal batteries 710, in this embodiment four (4), are positioned adjacent the interior surface of the insulation layer. It will be appreciated that only one of the thermal batteries 710 is shown in full in FIG. 13 for clarity. A thermal shield 715 is thermally coupled to an interior surface of the thermal batteries 710 and defines an interior space 720, as will be described further below.

In this embodiment, each thermal battery 710 comprises a generally C-shaped housing 725 having rounded corners. The housing 725 is made of a thermally conductive material such as for example aluminum, a composite material, a plastic material, etc. In this embodiment, the housing 725 is of a unitary design. A thermal storage medium inlet/outlet 730 and an air inlet/outlet 735 are provided adjacent to the end of an arm 740 of the housing 725. The thermal storage medium inlet/outlet 730 is configured to permit controlled ingress and egress of a thermal storage medium into and out of the housing 725. The air inlet/outlet 735 is configured to permit the ingress or egress of air into and out of the housing 725.

An interior surface of the housing 725 of each thermal battery 710 is thermally coupled to the thermal shield 710. As can be seen, since the housing 725 is C-shaped, each thermal battery 710 partially extends about the interior space 720. Each thermal battery 710 exchanges thermal energy with the thermal shield 715.

During use, to charge each thermal battery 710, thermal storage medium is pumped into the housing 725 via the thermal storage medium inlet/outlet 730. The thermal storage medium flows into the housing 725 until the thermal battery 710 is charged.

To discharge each thermal battery 710, air is pumped into the air inlet/outlet 735. The ingress of air forces the thermal storage medium to exit the housing 725 via the thermal storage medium inlet/outlet 730. Air can be pumped into the housing 725 until the desired amount of thermal storage medium has been removed from the housing 725. As will be appreciated, the removed thermal storage medium may be captured and recycled for further use. Once each thermal battery 710 has been discharged, each thermal battery 710 may be recharged as described above.

The storage unit 700 may be used as a heating storage unit or a cooling storage unit to maintain a generally uniform temperature within interior space 720 during shipping or storage operations such that any item placed within the interior space 720 does not spoil depending on the type of thermal storage medium used to charge the thermal batteries 710.

When used as a heating storage unit, thermal storage medium in the form of a heating liquid, such as for example glycol, is pumped into the thermal batteries 710 as described above.

When used as a cooling storage unit, thermal storage medium in the form of ice slurry having an ice fraction of approximately 40% or higher is pumped into the thermal batteries 710 as described above. The use of ice slurry having an ice fraction of 40% or higher permits the thermal batteries to be charged for an extended period of time. As will be appreciated, varying the concentration of additives used in the ice slurry varies the temperature of each thermal battery 710, and thus varies the temperature of the interior space 720.

Although the housing 730 of each thermal battery 710 is described above as being of a unitary design, those skilled in the art will appreciate that alternatives are available. For example, in another embodiment the C-shape of the housing may be made by connecting a straight body section to first and second straight arm sections via elbow joints.

Although the housing 730 of each thermal battery 710 is described above as being generally C-shaped, those skilled in the art will appreciate that alternatives are available. For example, in another embodiment the housing may be rectangular shaped such that each housing extends generally about the periphery of the interior space.

Although storage unit 700 is described above as comprising four (4) thermal batteries, those skilled in the art will appreciate that any number of thermal batteries may be used. For example, in another embodiment one thermal battery may be used. In another embodiment, five (5) thermal batteries may be used.

Although each thermal battery 710 is described above as comprising a thermal storage inlet/outlet, those skilled in the art will appreciate that alternatives are available. For example, in another embodiment each thermal battery may comprise a thermal storage inlet positioned at the end of one of the arms of the housing, and may comprise a thermal storage outlet positioned at the end of the other one of the arms of the housing.

Although the storage unit 700 is described as comprising a thermal shield thermally coupled to the interior surface of the thermal batteries 710, those skilled in the art will appreciate that alternatives are available. For example, in another embodiment, the thermal shield may be defined by the interior surface of the thermal batteries 710.

Although in embodiments above the thermal batteries are described as being separate from the thermal shield, those skilled in the art will appreciate that the thermal batteries may be integral with the thermal shield.

Although in embodiments above the thermal element is described as being in the form of a thermal shield, those skilled in the art that alternatives may be used. For example, in another embodiment the thermal element may be in the form of a heat pipe. In this embodiment, the heat pipe is positioned within the housing of the storage unit and is coupled to one or more thermal batteries.

Although in embodiments above the thermal shield is described as being made of a conductive material such as aluminum, those skilled in the art will appreciate that the thermal shield may be made of a corrugated conductive material such as corrugated aluminum. In this embodiment, the use of corrugated aluminum increases the structural integrity of the storage unit and reduces contact area between the thermal shield and any item positioned within the interior space.

Although in embodiments above the storage unit is described as comprising a door providing access to the interior space, those skilled in the art will appreciate that in other embodiments access to the interior space may be provided through other means such as for example through a lid.

Turning now to FIGS. 14 to 19, another embodiment of a storage unit is shown and is generally identified by reference numeral 800. In this embodiment, the storage unit 800 is collapsible and comprises a generally rectangular base 810, four (4) side panels 820 and thermal batteries 900*a* and 900*b*.

The base 810 is made of a thermally insulated rigid material and comprises a generally flat bottom (not shown) and four side walls 812 upwardly extending therefrom. Each of the side walls 812 comprises a groove 814 dimensioned to receive one or more of the side panels 820, as will be described. The flat bottom and side walls 812 define a recess for receiving the thermal battery 900*b*.

Figure 15:
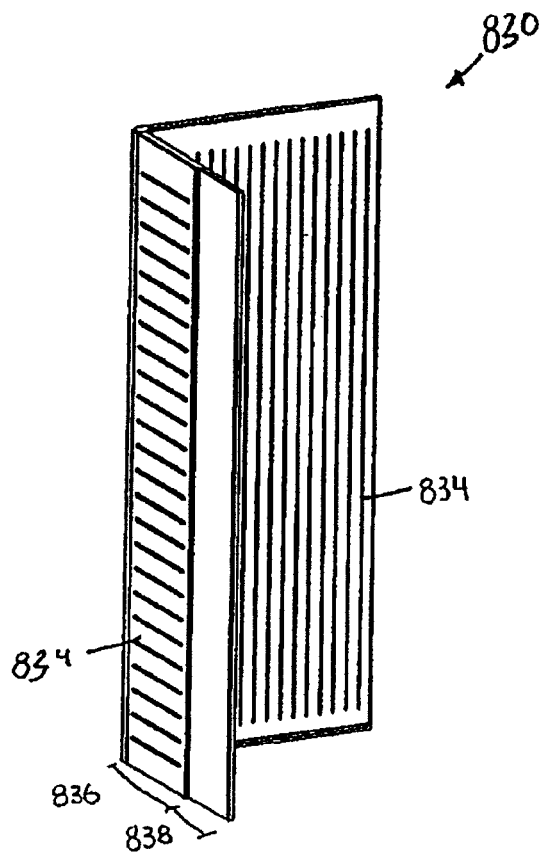
FIGS. 15 and 16 are isometric and top views, respectively, of a first type of side panel forming part of the collapsible storage unit of FIG. 14.
Figure 16:
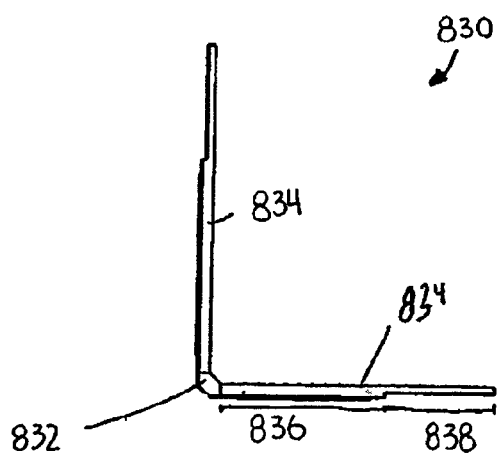

In this embodiment, the side panels 820 are of two types. A first type of side panel 830 is shown in FIGS. 15 and 16. As can be seen, the first type of side panel 830 comprises a spine 832 and two panel sections 834. The panel sections 834 extend from the spine 832 at a right angle with respect to one another, thereby defining an L-shape. Each panel section 834 comprises a first portion 836 and a second portion 838. The first portion 836 is proximate to the spine 832 and the second portion 838 is distal to the spine 832. The first portion 836 is wider than the second portion 838. The first portion 836 comprises three layers namely, a rigid layer, a thermally conductive layer, and an insulation layer positioned intermediate the rigid layer and the thermally conductive layer. The second portion 838 comprises three layers namely, a magnetic layer, a thermally conductive layer, and an insulation layer positioned intermediate the magnetic layer and thermally conductive layer.

Figure 17:
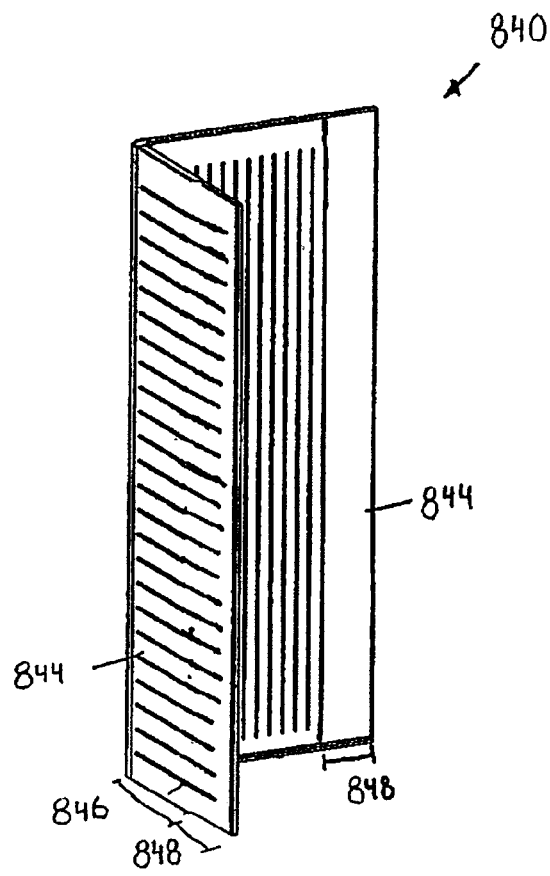
FIGS. 17 and 18 are isometric and top views, respectively, of a second type of side panel forming part of the collapsible storage unit of FIG. 14.
Figure 18:
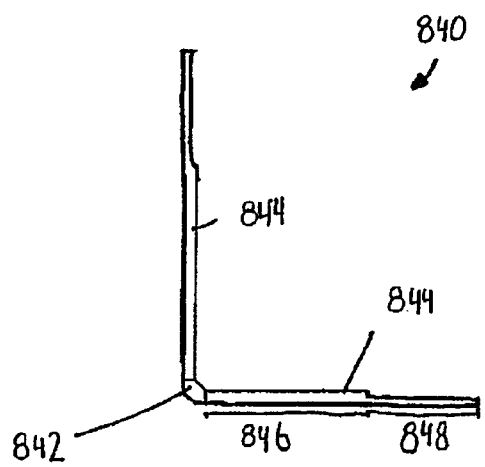

A second type of side panel 840 is shown in FIGS. 17 and 18. As can be seen, the second type of side panel 840 comprises a spine 842 and two panel sections 844. The spine 842 is made of a rigid material. The panel sections 844 extend from the spine 842 at a right angle with respect to one another, thereby defining an L-shape. Each panel section 844 comprises a first portion 846 and a second portion 848. The first portion 846 is proximate to the spine 842 and the second portion 848 is distal to the spine 842. The first portion 846 is wider than the second portion 848. The first portion 846 comprises three layers namely, a rigid layer, a thermally conductive layer, and an insulation layer positioned intermediate the rigid layer and the thermally conductive layer. The second portion 848 comprises three layers namely, a rigid layer, a magnetic layer and an insulation layer positioned intermediate the rigid layer and the magnetic layer.

Thermal battery 900*a* is similar to thermal battery 200*a* described above with the exception of the housing 910. In this embodiment, the housing 910 is configured to fit atop the four (4) side panels 820, as will be described. Thermal battery 900*b* is similar to thermal battery 200*b* described above and is configured to be inserted into the recess of the base 810.

Figure 14:
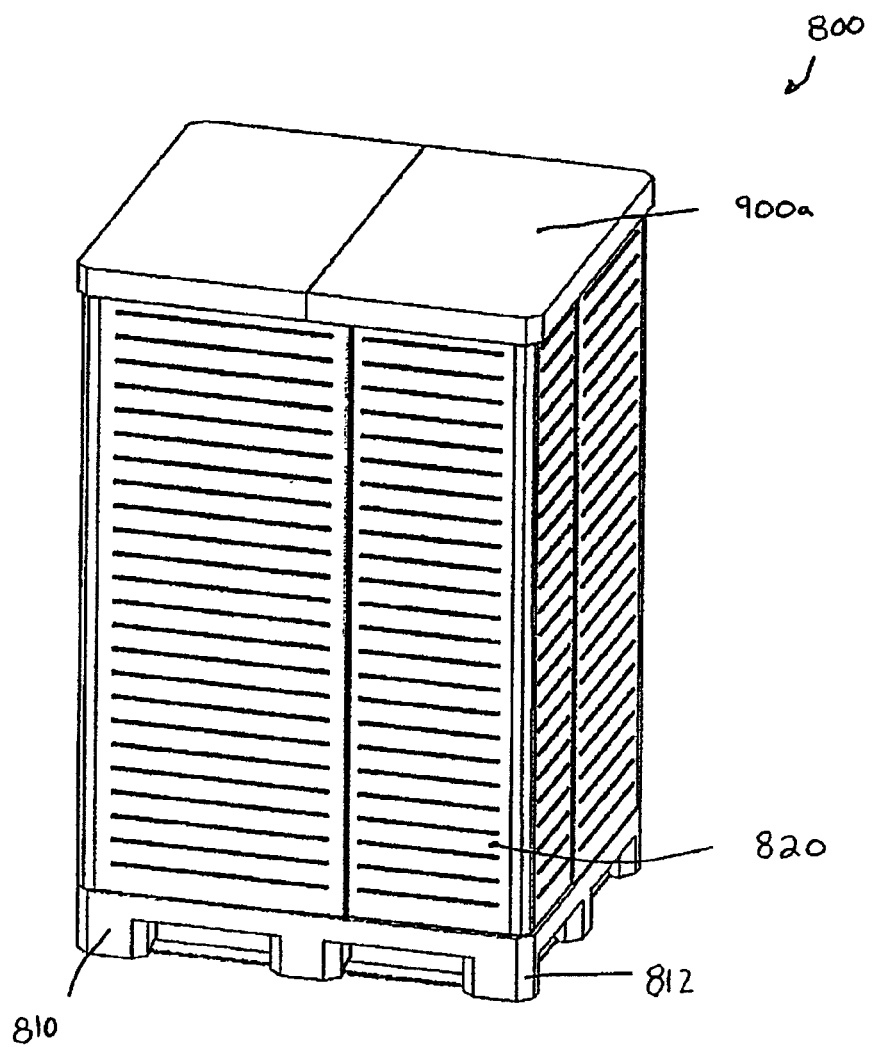
FIG. 14 is an isometric view of a collapsible storage unit.
Figure 19:
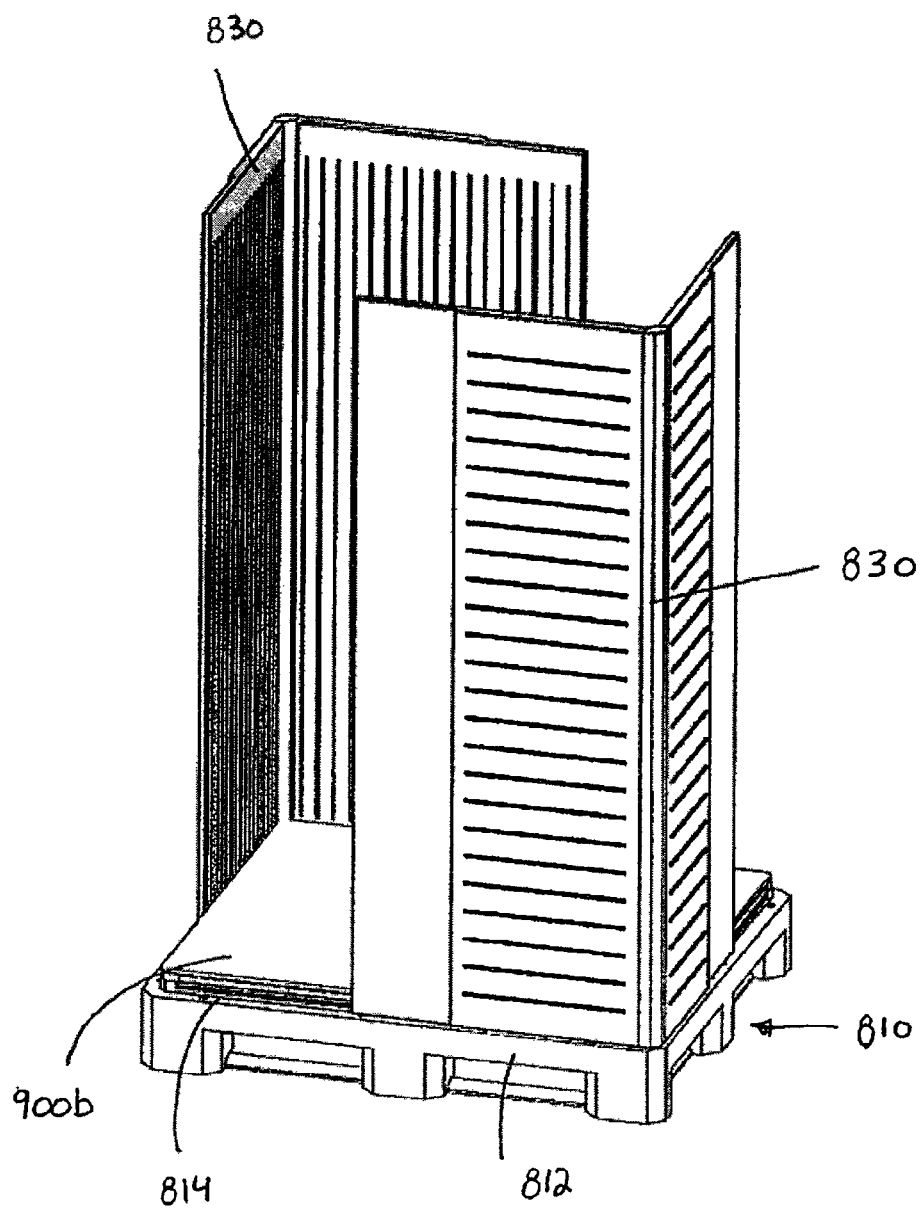
FIG. 19 shows the collapsible storage unit of FIG. 14 partially assembled.

To assemble the storage unit 800, thermal battery 900*b* is inserted into the recess of the base 810, as shown in FIG. 19. One of the first type of side panels 830 is inserted into groove 814 thereby fitting into a first corner of the base 810. The other first type of side panel 830 is inserted into groove 814 thereby fitting into a third corner of the base 810, opposite the first corner of the base 810. One of the second type of side panels 840 is inserted into groove 814 thereby fitting into a second corner of the base 810, intermediate the first and third corners of the base 810. The other second type of side panel 840 is inserted into groove 814 thereby fitting into a fourth corner of the base 810, opposite the second corner of the base 810 and intermediate the first and third corners of the base 810. The magnetic portions of the second type of side panels 840 overlap and magnetically mate with the magnetic portions of the first type of side panels 830. Thermal battery 900*a* is then positioned on top of four (4) side panels 820 as shown in FIG. 14, thereby enclosing an interior space.

Each of the four (4) side panels 820 is positioned such that the conductive layer faces the interior space. As a result, the conductive layer of each of the four (4) side panels 820 is thermally coupled to each of the thermal batteries 900*a* and 900*b*.

The storage unit 800 may be used as a heating storage unit or a cooling storage unit to maintain a generally uniform temperature within the interior space during shipping or storage operations such that any item placed within the interior space does not spoil due to extreme high or low temperatures. When used as a heating storage unit, a thermal storage medium in the form of a heating liquid, such as glycol, is pumped into the thermal batteries 900*a* and 900*b* as described above (with reference to thermal batteries 200*a* and 200*b*). As will be appreciated, different types of heating liquid may be used to reach the desired temperature of the interior space. When used as a cooling storage unit, a thermal storage medium in the form of ice slurry having an ice fraction of approximately 40% or higher is pumped into the thermal batteries 900*a* and 900*b* as described above (with reference to thermal batteries 200*a* and 200*b*). The use of ice slurry having an ice fraction of 40% or higher permits the thermal batteries to be charged for an extended period of time. As will be appreciated, varying the concentration of additives used in the ice slurry varies the temperature of each thermal battery 900*a* and 900*b*, and thus varies the temperature of the interior space. When not in use, the storage unit 800 may be disassembled and stored for future use.

Although each side panel 820 is described as comprising a spine and two panel sections extending from the spine, those skilled in the art will appreciate that the two panel sections may be hingeably attached to the spine. In this embodiment, the size of the storage unit is further reduced when not in use.

In another embodiment, the thermal storage medium may be mixed with low friction additives to ensure smooth flow.

In another embodiment, the thermal shield may comprise one or more flaps that extend into the interior space. In this embodiment, the one or more flaps are made of a thermally conductive material and may be positioned to be in contact or in between one or more temperature sensitive items positioned within the interior space to enhance temperature control.

Although in embodiments described above the thermal storage medium inlet/outlet is described as permitting the ingress and egress of thermal storage medium, those skilled in the art will appreciate that the thermal storage medium may also permit the ingress/egress of liquid.

Although in embodiments above wherein the thermal storage medium is described as being ice slurry having an ice fraction of approximately 40% or higher, those skilled in the art will appreciate that ice slurry having a different ice fraction may be used.

Although in embodiments above the thermal storage medium is described as being ice slurry or glycol, those skilled in the art will appreciate that other types of storage medium may be used.

Although in embodiments above the thermal batteries are described as having interior wall structure, in another embodiment, the thermal batteries may comprise a plurality of pegs spaced about and extending from the bottom wall of the housing to the top wall of the housing.

Although in embodiments above the storage unit is described as comprising two thermal batteries, those skilled in the art will appreciate that more or fewer thermal batteries may be used.

Although in embodiments above the storage unit is described as having an interior space for storing temperature-sensitive items, those skilled in the art will appreciate that the interior space may be divided into separate compartments. In this embodiment, dividing panels may be used to separate the interior space into separate compartments. The temperature of each separate compartment may be maintained by a separate thermal battery. For example, the interior space may be divided into two compartments. A first one of the compartments may be thermally coupled to a first thermal battery and second one of the compartments may be thermally coupled to a second thermal battery such that the two compartments are maintained at different temperatures.

In another embodiment, the storage unit may comprise a visual indicator indicating to the user an approximate temperature or an approximate time left until the temperature can no longer be maintained. For example, the volume of thermal storage medium remaining within the thermal batteries may be measured. In another example, the temperature of the interior space may be monitored. In another example, the temperature within each of the thermal batteries may be measured.

Those skilled in the art will appreciate that the above-described storage units may comprise wheels, allowing the storage unit to be readily moveable.

Although in embodiments above the insulation layer is described as comprising a plurality of VIPs, those skilled in the art will appreciate that additional or other types of insulation may be used. For example, insulated foam may be sprayed around the VIPs to fill any voids between neighboring VIPS.

Although in embodiments above the thermal batteries are described as being mounted within the storage unit, those skilled in the art will appreciate that the thermal batteries may be removably mounted in the storage unit. For example, the storage unit may be provided with a spring-type receiving unit for receiving one of the thermal batteries. Alternatively, the batteries may be removably mounted in the storage unit through use of a conductive paste. In these embodiments, the thermal batteries may be easily replaced to ensure a generally constant temperature is maintained within the interior space.

Although in embodiments above the thermal batteries are described as being mounted in the top and bottom portions of the storage unit, those skilled in the art will appreciate that the thermal batteries may be positioned anywhere in the storage unit as long as it is thermally coupled to the thermal shield.

Although in embodiments above the interior wall structure is described as comprising an M-shaped member and dividing members, those skilled in the art will appreciate that other configurations may be used. For example, in another embodiment the interior wall structure may be shaped like double-helix.

Although the thermal batteries are shown as being used in a specific storage unit configuration, those skilled in the art will appreciate that the thermal batteries may be used in other storage unit configurations and may be employed in other environments where heating/cooling is required.

Although embodiments have been described above with reference to the accompanying drawings, those of skill in the art will appreciate that variations and modifications may be made without departing from the scope thereof as defined by the appended claims.

What is claimed is:

1. A storage unit for passive heating or cooling comprising:
   a rigid casing;
   vacuum insulated panels lining interior surfaces of said casing and enclosing an interior space within the casing for holding at least one item;
   a thermal element lining interior surfaces of the vacuum insulated panels; and
   at least one thermal battery within the casing and separated from the interior space by an internal panel, the at least one thermal battery being thermally coupled to the thermal element such that the at least one thermal battery exchanges thermal energy with the thermal element thereby distributing thermal energy to the interior space, wherein the at least one thermal battery comprises:
   a housing,
   an inlet to permit the ingress of thermal storage media into the housing, and
   an outlet to permit the egress of liquid from the housing.

2. The storage unit of claim 1 wherein the at least one thermal battery further comprises interior wall structure positioned within the housing for directing thermal storage media received via the inlet along a confined serpentine path.

3. The storage unit of claim 1 further comprising a piping assembly in fluid communication with the outlet of the at least one thermal battery.

4. The storage unit of claim 3 further comprising another piping assembly in fluid communication with the inlet of the at least one thermal battery, the another piping assembly for directing thermal storage media from a pumping unit to the inlet of the at least one thermal battery.

5. The storage unit of claim 1 further comprising a piping assembly in fluid communication with the inlet of the at least one thermal battery, the piping assembly for directing thermal storage media from a pumping unit to the inlet of the at least one thermal battery.

6. The storage unit of claim 1 wherein the at least one thermal battery is configured to be at least partially charged or fully charged with thermal storage media.

7. The storage unit of claim 1 wherein the at least one thermal battery comprises the thermal storage media.

8. The storage unit of claim 7 wherein the thermal storage media is one of ice slurry and heating liquid.

9. The storage unit of claim 1 comprising at least two thermal batteries within the casing, each thermal battery being separated from the interior space by a respective internal panel.

10. The storage unit of claim 9 further comprising at least one internal dividing panel, the at least one internal dividing panel dividing the interior space into at least a first compartment and a second compartment, the first compartment being maintained at a first temperature via a first thermal battery of the at least two thermal batteries and the second compartment being maintained at a second temperature via a second thermal battery of the at least two thermal batteries.

11. The storage unit of claim 10 wherein the first temperature is different than the second temperature.

12. The storage unit of claim 11 wherein each thermal battery is removable from the casing.

13. The storage unit of claim 10 wherein the first thermal battery is positioned adjacent a bottom of said casing and is separated from the internal space by a bottom internal panel and wherein the second thermal battery is positioned adjacent a top of said casing and is separated from the internal space by a top internal panel.

14. The storage unit of claim 1 wherein the at least one thermal battery is removable from the casing.

15. The storage unit of claim 1 wherein the inlet and outlet are adjacent opposite corners of the housing.

16. The storage unit of claim 1 wherein at least one internal surface of the at least one thermal battery is coated with a low friction material.

17. The storage unit of claim 1 wherein the at least one thermal battery further comprises a filter adjacent the outlet to permit the passage of liquid and to inhibit the passage of solid thermal storage media.

* * * * *